United States Patent [19]

Säufferer et al.

[11] 4,091,779

[45] May 30, 1978

[54] METHOD AND APPARATUS FOR INFLUENCING THERMO-CHEMICAL REACTIONS

[75] Inventors: Helmut Säufferer, Esslingen; Karl Willmann, Aichwald, both of Germany

[73] Assignee: Daimler-Benz Aktiengesellschaft, Germany

[21] Appl. No.: 635,752

[22] Filed: Nov. 28, 1975

[30] Foreign Application Priority Data

Nov. 28, 1974 Germany .................. 2456163

[51] Int. Cl.² ........................................ F23B 7/00
[52] U.S. Cl. ........................ 123/119 E; 123/141; 123/1 A
[58] Field of Search ............ 123/119 E, 119 EE, 141, 123/1 R, 1 A, 3

[56] References Cited

U.S. PATENT DOCUMENTS

| | | | |
|---|---|---|---|
| 3,110,294 | 11/1963 | Nyman | 123/119 E |
| 3,318,293 | 5/1967 | Hickling et al. | 123/119 E |
| 3,749,545 | 7/1973 | Velkoff | 123/119 E |
| 3,841,824 | 10/1974 | Bethel | 123/119 E X |

*Primary Examiner*—Charles J. Myhre
*Assistant Examiner*—Ira S. Lazarus
*Attorney, Agent, or Firm*—Caig & Antonelli

[57] ABSTRACT

A method and apparatus for influencing thermo-chemical reactions by means of an electric field, in which the ions formed by the reaction itself are directed by the application of the electric field in order to control the further reaction progress.

36 Claims, 5 Drawing Figures

METHOD AND APPARATUS FOR INFLUENCING THERMO-CHEMICAL REACTIONS

The present invention relates to a method and apparatus for influencing thermo-chemical reactions, especially of combustion processes as occur, for example, during the operation of Otto- and Diesel-engine, cracking carburetors, oil burners, refuse incinerators and the like.

Various operating methods are known in the prior art in which the properties of the substances participating in the combustion processes are influenced by electric fields. On the one hand, it was deemed necessary to free the gases reaching the combustion space of an internal combustion engine of ions in order not to disturb the development of the ignition spark. The German Pat. No. 418,557 suggests in that connection to conduct the gases prior to their introduction into the combustion space past an electrode system which is so electrically charged that the ions present in the air are held back. Other attempts proceeded exactly in the opposite direction, i.e., one had attempted to additionally charge or ionize the combustion mixture. It was thereby the aim either to improve the fine dispersion or atomization of the mixture by an electrostatic charging thereof (German Offenlegungsschrift Nos. 1,934,404 and 2,231,424) or by an increase of the ionization degree in the flame to increase by means of an electric gas discharge the number of the dissociative recombination processes in order to reduce the emission of harmful substances (German Offenlegungsschrift No. 2,253,249).

Insofar as in the prior art methods one has intervened in the combustion process by means of electric fields, this has taken place with such high field strengths that a gas discharge takes place for the increase of the ion concentration or even an electrolytic cracking of the fuel vapors or mists occurs (cf. German Pat. No. 874,672). Both represent a considerable consumption of electric power which, however, is not available everywhere. Additionally, many cases exist in which a high ion-concentration will rather become effective in a disadvantageous manner instead of in an advantageous manner. This is so as in addition to their reaction friendliness, on the one hand, ions also have the property, on the other hand, to function as condensation nuclei (as, for example, in the Wilson chamber, where they initiate the droplet formation in oversaturated water vapor). In the same manner, ions can act in a flame as condensation nuclei or cores for example, for carbon atoms or hydrocarbon fragments and thus may initiate a polymerization process, whose end products are coarse soot particles. An artificial increase of the ionization degree by gas discharge, in addition to the disadvantage of the electric power consumption, thus further entails the danger of increased soot formation.

The method according to the present invention for influencing thermo-chemical reactions is characterized in that the ions formed by the reaction itself are directed by the application of an electric field in order to control the further reaction progress. Consequently, in the present invention the electric field does not serve as heretofore for the creation of additional ions by gas discharge but instead as means for controlling the already present ions. These means which have not been utilized heretofore enable a control of the reaction process which requires substantially no power and is capable of being constructed in such a manner that the most varied and hitherto unknown control possibilities can be created therewith in a combustion space.

A first embodiment of the method according to the present invention for influencing the combustion in a combustion chamber consists in that the ions are sucked off by means of the electric field out of areas of a strong oxygen deficiency or shortage. The danger of the condensation of carbon atoms or hydrocarbon fragments at existing ions is particularly large in these areas which occur, for example, in Diesel engines with heterogeneous combustion or in oil burners with an open flame, because in that case the reaction process of these components with oxygen takes place more slowly. By sucking off the ions, these components, however, no longer find any condensation nuclei so that they cannot stick together or lump at one another into coarse soot. Sufficient time thus remains for the same to further mix with the oxygen and to react therewith, i.e., also within the area of strong oxygen deficiency, a complete combustion takes place. In the same manner, also the danger of the soot formation can be reduced in the so-called cracking carburetor with pure air cracking. By the removal of the flame ions out of the area with acute oxygen deficiency or shortage, additionally the emission of polycyclic aromates (3-4 benzopyrene) may be reduced.

A second embodiment of the method according to the present invention for influencing the combustion in a combustion chamber consists in that the ions are directed by means of the electric field into the quench areas of the chamber. These quenching zones lead to an incomplete combustion also with a homogeneous fuel distribution, and more particularly also if there are no places with acute oxygen deficiency or shortage. The uncombusted hydrocarbons which can be found in an Otto-engine in the exhaust gas thereof, notwithstanding a correctly adjusted carburetor or fuel injection system, stem from these quench areas at the relatively cool cylinder walls and various gaps. By directing the ions into the quench areas, however, the flames are driven into these areas to an increased extent by means of the ion wind so that the combustion becomes extinct thereat only much later; the dimensions of the quench zones are decreased and therewith the quantity of non-combusted hydrocarbons is reduced.

A third embodiment of the present invention for influencing the combustion in a combustion chamber consists in continuously taking along the ions in the flame front by means of the electric field. If one operates a combustion engine with an air excess and influences thereby the ions in this manner, then one can expect that by reason of the reaction friendliness of the ions, the flame expands more rapidly, i.e., that the flame velocity is increased and with an excessively large air excess the danger for ignition misfirings is drastically reduced. Thus, a possibility results to operated the engine with higher air ratio numbers and therewith to improve the CO- and $NO_x$- values in the exhaust gas. This would also reduce the starting difficulties with a strongly leaned-down mixture, as one has to accept also in case of strict exhaust gas regulations even at summerlike temperatures.

According to a fourth embodiment of the present invention for influencing the combustion in a combustion chamber, one is able to fan the ions by means of the electric field into a ion wind enhancing the mixing of the oxygen with the fuel still during the combustion. As a result thereof, for example, in Otto engines, the danger for ignition misfirings can be strongly reduced. The engine can therefore be operated with higher air/fuel ratios than customary heretofore without the danger that the CH-emission increases therewith. However, with a higher air/fuel ratio and by simultaneously influencing the flame ions by the electric fields with the avoidance of a gas discharge, one also succeeds in reducing the CO- and $NO_x$-emission in the exhaust gas.

The various embodiments of the present invention described hereinabove may, however, also be combined with one another in any suitable manner. Furthermore, for purposes of the $NO_x$-reduction during the combustion in a Diesel engine, the method of the present invention may also be modified to the extent that in addition to the application of an electric field preventing the soot formation, one provides an exhaust gas return and retards the instant of the fuel injection. This could never be realized heretofore in practice by reason of an excessively strong soot formation. The practical possibility of this measure which has now been made possible is one of the most important advantages of the present invention.

Generally speaking, a new control possibility for thermo-chemical reactions is made available by means of the method according to the present invention, which can be utilized with advantage in connection with the most varied reaction courses or developments, as to how the controlling field has to be constructed in its timely and spatial distribution, depends, of course, on the characteristics and properties of the respective reaction, the respectively existing surrounding conditions and the respective requirements. Corresponding parameters are, for example, the spatial location of quench zones, the spatial location of places of acute oxygen deficiency, the spatial mixture distribution in a combustion space as well as the mixture distribution therein per unit time, the velocity and direction of the flame expansion, the charge of the formed ions, the substances participating in the reaction, etc. If one knows these parameters, which can be readily determined by numerous methods available to a person skilled in the art, then a person skilled in the art is in a position to realize the respectively suited field for fulfilling the posed requirements. In a further development of the inventive concept, an arrangement for carrying out the method according to the present invention is characterized by at least two electrode bodies electrically insulated from one another, which have such a construction and such a position in relation to the space provided for a thermo-chemical reaction that a voltage applied therebetween leads to a field distribution directing the ions resulting from the reaction.

Accordingly, it is an object of the present invention to provide a method and apparatus for influencing thermo-chemical reactions which avoids by simple means the aforementioned shortcomings and drawbacks encountered in the prior art.

Another object of the present invention resides in a method and apparatus for influencing thermo-chemical reactions which is highly effective for its intended purposes yet avoids the need for large power consumption.

A further object of the present invention resides in a method and apparatus for influencing thermo-chemical reactions in which a high ion concentration is avoided to prevent the functioning of ions as condensation nuclei that may initiate a polymerization process leading to coarse soot particles as end products.

Still another object of the present invention resides in a method and apparatus for directing ions formed by the thermo-chemical reaction itself in such a manner that a control of the reaction progress substantially devoid of any power consumption is made possible thereby.

A further object of the present invention resides in a method and apparatus for influencing thermo-chemical reactions in such a manner that the most varied and heretofore unknown control possibilities can be created within a given combustion space.

Still a further object of the present invention resides in a method and apparatus for influencing thermo-chemical reactions such that a more complete combustion also takes place within the areas of the combustion space in which an acute oxygen deficiency exists.

A still further object of the present invention resides in a method and apparatus for influencing thermo-chemical reactions in which the quantity of non-combusted hydrocarbons present in the exhaust gas can be reduced which stem from an incomplete combustion, especially in quench zones.

Another object of the present invention resides in a method and apparatus for influencing thermo-chemcial reactions which minimizes the danger of misfirings while at the same time enabling operation of the engine with higher air ratio numbers to thus improve the exhaust gas quality.

Still another object of the present invention resides in a method and apparatus for influencing thermo-chemical reactions which is available for the most varied reactions.

These and other objects, features, and advantages of the present invention will become more apparent from the following description when taken in connection with the accompanying drawing which shows, for purposes of illustration only, several embodiments in accordance with the present invention, and wherein.

Figure 1:
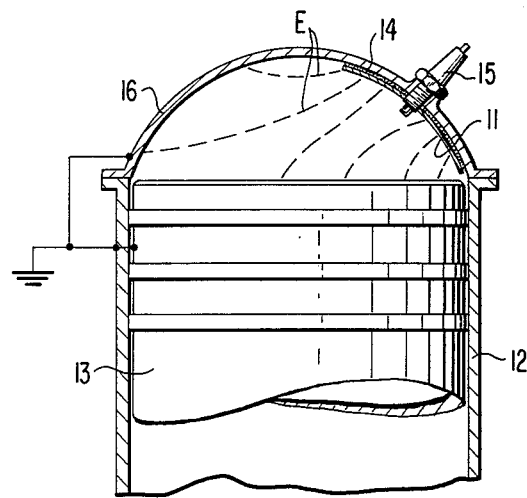
FIG. 1 is a schematic cross-sectional view through a first embodiment for realizing the method according to the present invention in an Otto engine.

Referring now to the drawing wherein like reference numerals are used throughout the various views to designate like parts and more particularly to FIG. 1, a cylinder 12 of an Otto-engine with a piston 13, a cylinder head 16 and a spark plug 15 is schematically illustrated in this figure; the end of the spark plug 15 projects into the cylinder head 16 in order to ignite the mixture compressed therein. A field electrode 11 is secured at the cylinder head 16 within the area of the spark plug 15, which is high-voltage insulated with respect to the cylinder head 16 by conventional means.

In the illustrated case, the field electrode 11 has the shape of a plate which is concavely curved corresponding to the cylinder head dome. The electrode 11 is connected with the positive pole of a high voltage source (not shown) of about 5 to 10 kv, whose negative pole is connected to ground. The metal of the cylinder head 16, of the cylinder 12 and of the piston 13 is also electrically connected with ground.

An electric field distribution results from the described arrangement as is illustrated by the field lines E.

The field lines E extend from the electrode 11 to the walls of the combustion space, i.e., the positive ions formed during the combustion are accelerated from the area of the spark plug 15 toward the walls. As a result thereof, they are taken along with the expanding flame front, accelerate the flame expansion and concentrate in the quench zones at the relatively cool walls.

The insulating layer 14 located between the electrode 11 and the cylinder head 16 is thereby so constructed that heat can be removed or carried off from the electrode 11 by ways of this insulating layer. Alternatively or additionally, the electrode 11 itself may be so constructed that it has a relatively high heat capacity. Both serve to avoid temperature peaks in the electrode, which might possibly lead to misfirings of the combustion mixture.

Figure 2A:
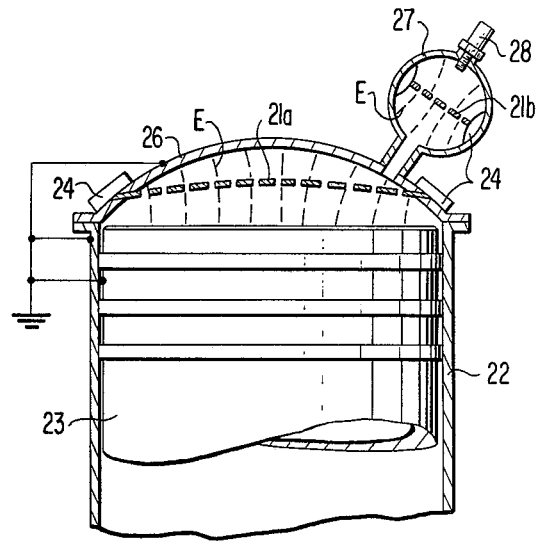
FIGS. 2a and 2b are schematic partial cross-sectional views of modified embodiments for realizing the method in accordance with the present invention in a Diesel engine.

In a Diesel engine, this rule as regards misfirings does not exist. In that case, an ignition by means of a hot electrode does not disturb but may partly even be of advantage because it shortens the pre-reaction time and thus a more favorable acoustic behavior of the Diesel engine is attained. FIG. 2a shows an arrangement for a Diesel engine, in which the field electrode 21a is constructed lattice-like or mesh-like and extends transversely through the cylinder head 26. It is retained at the cylinder head exclusively at the edge of the insulating material 24 so that the heat transfer is smaller than in the preceding case. The electrode 21a also in this case is connected to a terminal or pole of a high voltage source whose other terminal or pole as also the metal of the cylinder head 26, of the cylinder 22 and of the piston 23 are connected to ground. The electric field distribution resulting therefrom is indicated by the field lines E in FIG. 2a. It can be recognized that also in this case the resulting ions are deflected into the quench zones.

In case the Diesel engine has a pre-chamber, as is indicated in FIG. 2a by reference numeral 27, a second field electrode 21b may preferably be provided which is high-voltage insulated with respect to the wall of the pre-chamber by the insulating material 24. This second electrode 21b is at a high voltage potential which may be equal to the potential of the first electrode 21a or may differ therefrom in its magnitude and/or sign.

Figure 2B:
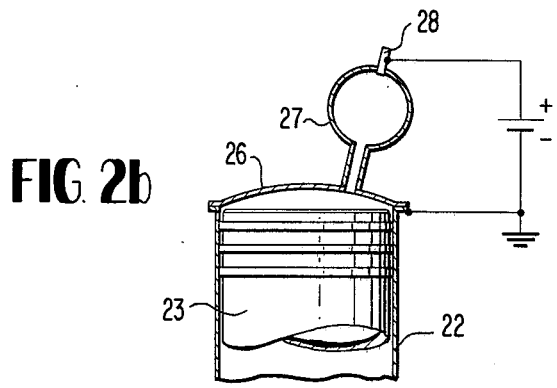

As shown in FIG. 2b, also the injection nozzle 28 may be connected to the high voltage potential in order to suck off the ions out of the pre-chamber throat. According to another embodiment (not shown), in a pre-chamber Diesel engine a strong electric field is realized within the area of the most vehement combustion in that the pre-chamber together with the connecting channel between the pre-chamber and the main chamber are electrically insulated with respect to the remaining engine structure and are a high voltage.

In the combustion space of a direct injection engine without separately installed field electrode, one is also able to get along in that one produces the electric field by means of an injection nozzle connected to the high voltage. With a pre-chamber Diesel engine, the ball retained by webs which heretofore served as pure heat capacity, may be mounted in an insulated manner and may be connected to the high voltage in order to thus serve simultaneously as electrode.

In all of the cases described hereinabove, the potentials at the electrodes may be either constant or may be varied as a function of the piston position or crank angle position in order to take into account the differing conditions during the progress of the combustion. Since the means for varying the potentials involve conventional electrical and/or electronic control means known as such to persons skilled in the art, a detailed description thereof is dispensed with herein for the sake of simplicity.

Figure 3A:
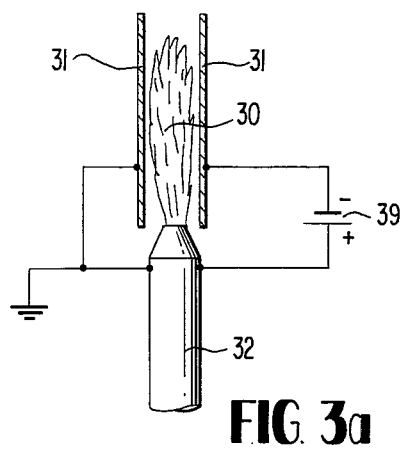
FIGS. 3a and 3b are schematic views illustrating two further modified embodiments for realizing the method in accordance with the present invention with a burner.
Figure 3B:
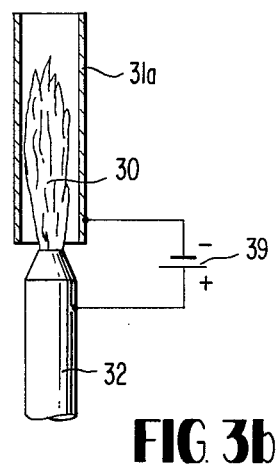

FIGS. 3a and 3b illustrate arrangements for influencing the reaction progress with a burner having an open flame. In the embodiment of FIG. 3a, two flat electrodes 31 in the manner of a plate condenser are disposed on opposite sides of the burner flame 30 which are connected with the poles or terminals of a high voltage source 39. The burner nozzle 32 itself may be connected with one of the electrodes. In the embodiment of FIG. 3b, a tubularly shaped electrode 31a is provided which surrounds the flame 30 and is connected to the negative pole of the high voltage source 39. The positive pole is connected with the burner nozzle 32. In both of these embodiments, ions are sucked out of the reaction zone so that the condensation nuclei are eliminated and the soot formation is reduced. The arrangement according to FIG. 3b is suitable in particular for oil burners in central heating systems. The electrodes 31 and 31a may consist of solid material. Preferably, however, they are constructed mesh-like.

The principle according to the present invention differs quite considerably from the method of the soot separation by means of electrostatic fields which are known as electro-filtering. In the method according to the present invention, this soot formation is suppressed already in statu nascendi, and less soot is formed in the flame already beforehand. However, if nonetheless a "soot seed" should form, then the latter is rapidly moved out of the area of the flame and its growth is stopped early so that in all cases no large soot particles can result.

In the method according to the present invention, the field strengths are lower than those which would lead to a gas discharge. It is assured thereby that practically no electric power is consumed. The influenceability of a flame requires the higher a field strength, the higher the pressure is and the more rapidly the combustion process proceeds. At high pressures breakdowns will occur only at very high field strengths, so that one is still able to get along without a power-consuming gas discharge up to relatively high combustion velocities.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for influencing thermo-chemical reactions by means of an electric field, comprising the step of directing the ions formed by the reaction itself, as opposed to ionizing of the reactant mixture, by applying the electric field in order to control the further reaction progress.

2. A method according to claim 1, for influencing the combustion in a combustion chamber having areas of oxygen deficiency, comprising the step of sucking the ions by means of the electric field out of the areas of strong oxygen deficiency in the combustion chamber.

3. A method according to claim 1, for influencing the combustion in a combustion chamber provided with quench areas, comprising the step of directing the ions by means of the electric field into the quench areas of the chamber.

4. A method according to claim 1, for influencing the combustion in a combustion chamber, comprising the step of continuously taking along the ions in the flame front by means of the electric field.

5. A method according to claim 1, for influencing the combustion in a combustion chamber, comprising the step of fanning the ions by means of the electric field into an ion wind enhancing the mixing of the oxygen with fuel.

6. A method according to claim 1, for the $NO_x$-reduction during the combustion in a Diesel engine, comprising the steps of returning the exhaust gases of the engine and retarding the instant of fuel injection.

7. An arrangement for influencing thermo-chemical reactions by electric field means, characterized in that, as opposed to ionizing the reactant mixture, the ions produced by the thermo-chemical reaction itself are directed by the application of the electric field means in such a manner as to control the further reaction progress.

8. An arrangement according to claim 7, for influencing the combustion in a combustion chamber having areas of oxygen deficiency, characterized by means including the electric field means for sucking the ions out of areas of oxygen deficiency within the combustion chamber by means of the electric field means.

9. An arrangement according to claim 7, for influencing the combustion in a combustion chamber provided with quench areas, characterized by means including the electric field means for directing the ions by means of the electric field means into the quench areas of the chamber.

10. An arrangement according to claim 7, for influencing the combustion in a combustion chamber, characterized by means including the electric field means for continuously taking along the ions in the flame front by means of electric field means.

11. An arrangement according to claim 7, characterized by means including the electric field means for fanning the ions into an ion wind enhancing the mixing of the oxygen with the fuel by means of the electric field means.

12. An arrangement according to claim 7, for the $NO_x$-reduction during the combustion in a Diesel engine, characterized by an exhaust gas return means, and means for retarding the instant of the fuel injection.

13. An arrangement for influencing thermo-chemical reactions within a space means provided therefor, characterized by at least two electrode body means electrically insulated from one another, which have such a configuration and such a position in relation to the space means provided for the thermo-chemical reaction that a voltage applied therebetween leads to a field distribution directing the ions resulting from the reaction itself, as opposed to ionizing of the reactant mixture.

14. An arrangement with a combustion chamber means according to claim 13, characterized in that a field electrode means forming one of the electrode body means is arranged in the combustion chamber means, which is connected to one pole of a high voltage source whose other pole is connected with the conductive boundary wall means of the combustion chamber means insulated with respect to the field electrode means and forming a part of the other electrode body means.

15. An arrangement according to claim 14, characterized in that the field electrode means is connected with the positive pole of the high voltage source and the wall means of the combustion chamber means with the negative pole thereof.

16. An arrangement according to claim 15, characterized in that the high voltage source supplies a voltage of about 5 to 10 kv.

17. An arrangement according to claim 16, for an Otto engine, characterized in that the field electrode means is secured high-voltage insulated at a cylinder head in proximity of a spark plug and has at least one of the characteristics consisting of relatively large heat transfer and heat capacity in order to decrease temperature peaks for purposes of avoiding misfirings.

18. An arrangement according to claim 17, characterized in that the field electrode has both a relatively large heat transfer capacity and a relatively large heat storage capacity.

19. An arrangement according to claim 16, for a Diesel engine, characterized in that the field electrode means is a lattice-like structure extending through the cylinder head and secured in an insulated manner at the inner wall of the cylinder head.

20. An arrangement according to claim 19, for a pre-chamber Diesel engine, characterized in that a second electrode means is arranged in the pre-chamber which is electrically insulated with respect to the walls of the pre-chamber and is at a high voltage.

21. An arrangement according to claim 16, for an internal combustion engine with direct fuel injection, characterized by an injection nozzle means electrically insulated with respect to the remaining engine block and connected as field electrode means to a high voltage source.

22. An arrangement according to claim 16, for a pre-chamber Diesel engine, characterized in that the pre-chamber together with its connecting channel between pre-chamber and main chamber is electrically insulated with respect to the remaining engine block and is at a high voltage.

23. An arrangement according to claim 16, for a pre-chamber Diesel engine, characterized by a heat capacity ball means disposed in the pre-chamber and retained by webs, said ball means being electrically insulated with respect to the remaining structure and being connected as field electrode means to a high voltage source.

24. An arrangement according to claim 16, characterized by means for varying the electric potentials of the electrode means as a function of the piston position of the engine.

25. An arrangement according to claim 13, for a burner with a substantially open flame, characterized in that two substantially parallel flat electrode means are arranged on opposite sides of the burner flame which are connected with the poles of a high voltage source.

26. An arrangement with a burner nozzle means according to claim 25, characterized in that the burner nozzle means is electrically connected with one of the electrode means.

27. An arrangement with a burner nozzle means according to claim 13, for a burner with a substantially open flame, characterized in tha a substantially cylindrical electrode means surrounding the burner flame is connected to the negative pole of a high voltage source and the burner nozzle means is connected to the positive pole thereof.

28. An arrangement according to claim 27, characterized in that the electrode means are mesh-like.

29. An arrangement according to claim 25, characterized in that the electrode means are mesh-like.

30. An arrangement according to claim 14, for an Otto engine, characterized in that the field electrode means is secured high-voltage insulated at a cylinder head in proximity of a spark plug and has at least one of the characteristics consisting of relatively large heat transfer and heat capacity in order to decrease temperature peaks for purposes of avoiding misfirings.

31. An arrangement according to claim 14, for a Diesel engine, characterized in that the field electrode means is a lattice-like structure extending through the cylinder head and secured in an insulated manner at the inner wall of the cylinder head.

32. An arrangement according to claim 31, for a pre-chamber Diesel engine, characterized in that a second electrode means is arranged in the pre-chamber which is electrically insulated with respect to the walls of the pre-chamber and is at a high voltage.

33. An arrangement according to claim 14, for an internal combustion engine with direct fuel injection, characterized by an injection nozzle means electrically insulated with respect to the remaining engine block and connected as field electrode means to a high voltage source.

34. An arrangement according to claim 14, for a pre-chamber Diesel engine, characterized in that the pre-chamber together with its connecting channel between pre-chamber and main chamber is electrically insulated with respect to the remaining engine block and is at a high voltage.

35. An arrangement according to claim 14, for a pre-chamber Diesel engine, characterized by a heat capacity ball means disposed in the pre-chamber and retained by webs, said ball means being electrically insulated with respect to the remaining structure and being connected as field electrode means to a high voltage source.

36. An arrangement according to claim 14, characterized by means for varying the electric potentials of the electrode means as a function of the piston position of the engine.

* * * * *